UNITED STATES PATENT OFFICE.

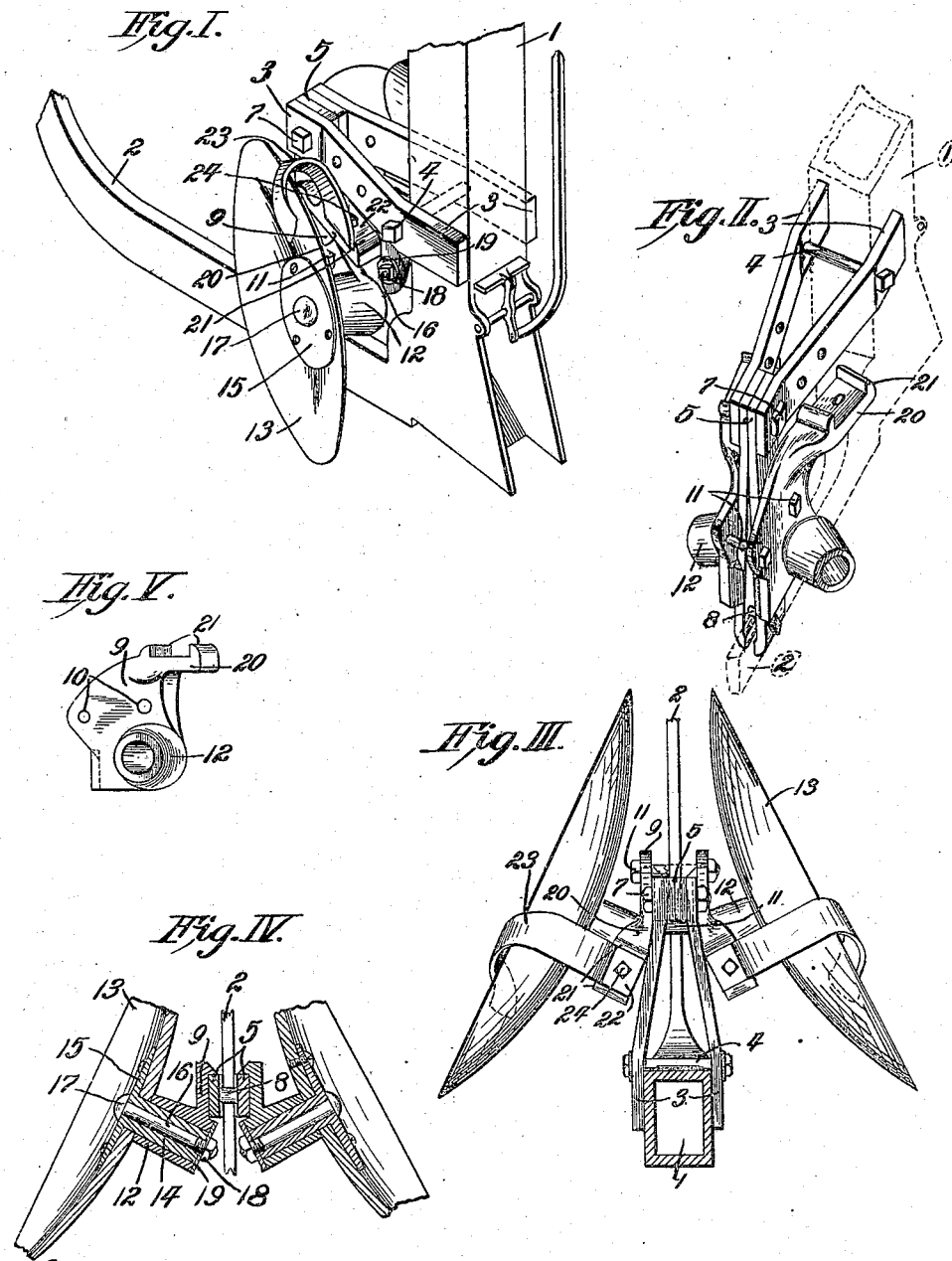

LAURITS T. RASMUSSEN, OF COUNCIL BLUFFS, IOWA, ASSIGNOR TO WALKER MANUFACTURING COMPANY, OF COUNCIL BLUFFS, IOWA, A CORPORATION OF SOUTH DAKOTA.

FURROW-OPENER.

942,281.

Specification of Letters Patent.  Patented Dec. 7, 1909.

Application filed February 25, 1909. Serial No. 480,050.

*To all whom it may concern:*

Be it known that I, LAURITS T. RASMUSSEN, a citizen of the United States, residing at Council Bluffs, in the county of Pottawattamie and State of Iowa, have invented certain new and useful Improvements in Furrow-Openers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to furrow openers and more particularly to a device of that class which may be attached to planters of ordinary and well known construction.

It is the principal object of my invention to provide a furrow opener which is simple and economical in construction, which may be easily and quickly attached to a planter, and which possesses durability to withstand the wear incident to the use of such devices. In accomplishing these objects I have provided the improved details of structure presently described and pointed out in the appended claims, reference being had to the accompanying drawings, in which:—

Figure I is a perspective view of the rear portion of a planter seed tube and shoe, to which my improved furrow opener is attached. Fig. II is a front perspective view of the body portion of the device, the disks being removed, and the seed tube and shoe indicated in dotted lines. Fig. III is a plan view of Fig. I. Fig. IV is a horizontal sectional view through the centers of the disk hubs. Fig. V is a detail view of one of the body plates.

Referring more in detail to the parts:—1 designates a seed tube, and 2 the shoe of a planter of ordinary construction, such parts forming in themselves no part of my present invention, but here shown to illustrate the application of my improved furrow opener thereto.

3 designates arms, the rear portions of which embrace the seed tube 1 and are clamped tightly thereto by the bolt 4.

5 designates a standard preferably comprising a pair of leg members, the upper portions of which are connected with the attaching arms 3 by means of a bolt 7, and the lower portions of which are set over the planter shoe and tightly clamped thereagainst by the bolt 8. I prefer to extend the upper ends of the standard legs between the attaching arms 3, as I have found that greater rigidity is had by combining the parts in this manner.

9 designates body plates, one of which is arranged on each side of the standard 5 and provided with apertures 10 through which the bolts 11 are projected for the purpose of tightening such plates firmly against the standard. Each of the plates 9 is provided with a hub sleeve 12 which is extended laterally at a slight forward angle from its plate in order to set the opener disk at the proper angle when the parts are assembled.

13 designates disks, each of which is provided with a central aperture, and 14 designates hubs which are adapted to project through the disk apertures and through the channels of the sleeve 12, each of said hubs being provided with a flange 15 which is adapted to abut against the concaved surface of a disk and be bolted, or otherwise permanently secured thereto, the hubs being of such length that their inner ends terminate flush with the inner ends of the sleeves 12. Each of hubs 14 is channeled longitudinally to receive an attaching bolt 16, the outer end of which has a head 17 for binding against the hub flange and is threaded at its inner end to carry a nut 18, a washer 19 being interposed between the nut and the outer ends of the hub and sleeve, so that the parts are held together, although the hub is permitted to revolve in the sleeve.

In the upper end of each body plate 9 is a shelf 20, having keeper flanges 21 between which the attaching lip 22 of a cleaner blade 23 is adapted to set. 24 designates a bolt by which said attaching lip is fixed to its shelf.

In assembling the furrow opener with a planter, the arms 3 may be moved toward or from each other to vary the opening therebetween, so that they may fit the seed tube of the planter with which the device is to be used, the standard legs 5 being manipulated in like manner to fit the planter shoe, and both the arm and leg members being tightened against their respective carrying parts, when in adjusted position, through the medium of the bolts 4 and 8. With the opener so mounted on the planter, when the latter is in operation, the disks 13 will revolve by their frictional contact with the ground, the hubs 14 revolving in their sleeves in the manner apparent from the foregoing description and drawings.

By mounting the cleaner blades on the upper portion of the plates 9, a firmer cleaning action is secured and a saving of blade material effected, as the blade is much shorter than those used with furrow openers previously constructed.

When it is desired to vary the elevation of the disks 13, the bolts 11 which secure the disk mounting plates 9 to the standard 5, may be released and such plates raised or lowered on the standard and again tightened when the disks have attained the desired elevation.

Having thus described my invention, what I claim as new therein and desire to secure by Letters-Patent is:—

1. In a furrow opener, a standard adapted for connection with a planter shoe, arms mounted on said standard and adapted for embracing a seed tube, means for tightening said arms against said seed tube, body plates secured to opposite sides of said standard, bolts connecting said body plates and extending at opposite edges of said standard, and disk members revolubly mounted on said body plates.

2. In combination with the seed tube and shoe of a planter, a standard having a solid upper part and a bifurcated lower part, the lower part engaging said shoe; a bolt passing through the upper end of the standard; a pair of horizontally disposed arms secured by said bolt to the standard, said arms extending rearwardly to the seed tube and straddling the same and secured thereto by a bolt passing forward of said tube, body plates secured directly to the outer sides of the standard and solely supported thereby; and disks mounted on said body plates.

3. In combination with the seed tube and shoe of a planter, a standard comprising twin bars secured together at their upper ends and diverging downwardly, their lower ends engaging said shoe; a pair of horizontally disposed arms contacting the outer sides of the seed tube and the standard and secured to the standard at the upper end thereof by a bolt passing through said arms and standard, and secured to the seed-tube by a bolt passing at the front of said tube, body plates secured directly to the outer sides of the standard and solely supported thereby, axles carried by the body plates; and disks mounted on said axles.

4. In furrow openers, the combination with a planter seed tube and shoe, of a standard located forwardly from the seed-tube, a pair of body plates formed to engage the outer sides of the standard and provided with bolt-holes at front and rear of the standard and formed with outwardly projecting bosses, and bolts passing through said bolt holes for securing said plates to the standard.

In testimony whereof I affix my signature in presence of two witnesses.

LAURITS T. RASMUSSEN.

Witnesses:
W. I. WALKER,
G. F. SPOONER.